(12) United States Patent
Abdelhalim et al.

(10) Patent No.: US 12,158,813 B2
(45) Date of Patent: Dec. 3, 2024

(54) SYSTEMS AND METHODS FOR RESTORING CRITICAL SOFTWARE USING MANAGEMENT CONTROLLER

(71) Applicant: Dell Products L.P., Round Rock, TX (US)

(72) Inventors: Alan H. Abdelhalim, Pflugerville, TX (US); Ibrahim Sayyed, Georgetown, TX (US); Anand P. Joshi, Round Rock, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 66 days.

(21) Appl. No.: 18/166,037

(22) Filed: Feb. 8, 2023

(65) Prior Publication Data
US 2024/0264907 A1    Aug. 8, 2024

(51) Int. Cl.
*G06F 11/00*  (2006.01)
*G06F 8/61*  (2018.01)
*G06F 8/71*  (2018.01)
*G06F 11/14*  (2006.01)
*G06F 11/30*  (2006.01)

(52) U.S. Cl.
CPC ............ *G06F 11/1417* (2013.01); *G06F 8/61* (2013.01); *G06F 8/71* (2013.01); *G06F 11/3051* (2013.01)

(58) Field of Classification Search
CPC ............ G06F 11/1417; G06F 11/2289; G06F 11/3051; G06F 8/61; G06F 8/71
See application file for complete search history.

(56) References Cited

U.S. PATENT DOCUMENTS

| | | | |
|---|---|---|---|
| 2003/0074444 A1* | 4/2003 | Ahrens, Jr. | G06F 11/3051 712/30 |
| 2014/0298315 A1* | 10/2014 | Boudreau | G06F 8/658 717/174 |
| 2017/0249357 A1* | 8/2017 | Adler | G06F 16/13 |
| 2021/0294596 A1* | 9/2021 | Ashirvad | H04L 41/142 |

* cited by examiner

*Primary Examiner* — Marc Duncan
(74) *Attorney, Agent, or Firm* — Jackson Walker L.L.P.

(57) ABSTRACT

An information handling system may include a processor and a management controller electrically coupled to the processor and configured to provide out-of-band management facilities for management of the information handling system, the management controller further configured to in response to one or more heartbeat synchronization signals received from a software service of the information handling system, wherein each of the one or more heartbeat synchronization signals is associated with an item of software stored on the information handling system, determine if any critical software is missing from the information handling system, and for each item of missing critical software, cause a service operating system of the information handling system to stage installation of a restore image of such item.

21 Claims, 2 Drawing Sheets

SYSTEMS AND METHODS FOR RESTORING CRITICAL SOFTWARE USING MANAGEMENT CONTROLLER

TECHNICAL FIELD

The present disclosure relates in general to information handling systems, and more specifically to restoring critical software to an information handling system using a management controller of the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When information handling system manufacturers and original equipment manufacturers deliver hardware to customers, they often include a set of critical software modules that are needed to ensure correct functionality of an information handling system, as well as a set of value-add applications to enhance user experience. For example, such critical software set may include services that gather telemetry from a management controller, basic input/output system (BIOS), and/or operating system in order to monitor health and usage of an information handling system and provide a means to proactively detect and address problems with the information handling system that may negatively affect user experience. In addition to detection and solving of problems with the information handling system, such critical software may also push data to the cloud in order to enable the manufacturer to perform analytics to gain insights into the health and performance of its products in order to drive continuous improvements of the manufacturer's products.

However, a user may uninstall such critical software or re-image the information handling system, which may cause the loss of critical health and performance monitoring functionality capable of detecting problems that may prevent data loss and minimize downtime, and the manufacturer may lose key data relating to actual use in the field that may allow the manufacturer to detect problems and receive real-world deployment feedback.

In cases in which the user system is recoverable, recovery methods available to a user may be limited in their capabilities and reactive in nature. Such methods may not restore the critical software functionality that was uninstalled/lost, may be employed after a loss of data and/or productivity, and may require assistance from technical support with may be time-consuming and expensive to both users and the manufacturer. Accordingly, systems and methods for restoring such critical software may be desired.

SUMMARY

In accordance with the teachings of the present disclosure, the disadvantages and problems associated with effective provisioning and deployment of an operating system may be reduced or eliminated.

In accordance with embodiments of the present disclosure, an information handling system may include a processor and a management controller electrically coupled to the processor and configured to provide out-of-band management facilities for management of the information handling system, the management controller further configured to in response to one or more heartbeat synchronization signals received from a software service of the information handling system, wherein each of the one or more heartbeat synchronization signals is associated with an item of software stored on the information handling system, determine if any critical software is missing from the information handling system, and for each item of missing critical software, cause a service operating system of the information handling system to stage installation of a restore image of such item.

In accordance with these and other embodiments of the present disclosure, a method may include in response to one or more heartbeat synchronization signals received from a software service of an information handling system by a management controller, wherein each of the one or more heartbeat synchronization signals is associated with an item of software stored on the information handling system, determining, by the management controller, if any critical software is missing from the information handling system. The method may also include for each item of missing critical software, causing, by the management controller, a service operating system of the information handling system to stage installation of a restore image of such item.

In accordance with these and other embodiments of the present disclosure, an article of manufacture may include a computer readable medium and computer-executable instructions carried on the computer readable medium, the instructions readable by a processor, the instructions, when read and executed, for causing the processor to, in a management controller of an information handling system: (i) in response to one or more heartbeat synchronization signals received from a software service of an information handling system by the management controller, wherein each of the one or more heartbeat synchronization signals is associated with an item of software stored on the information handling system, determine if any critical software is missing from the information handling system; and (ii) for each item of missing critical software, cause a service operating system of the information handling system to stage installation of a restore image of such item.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
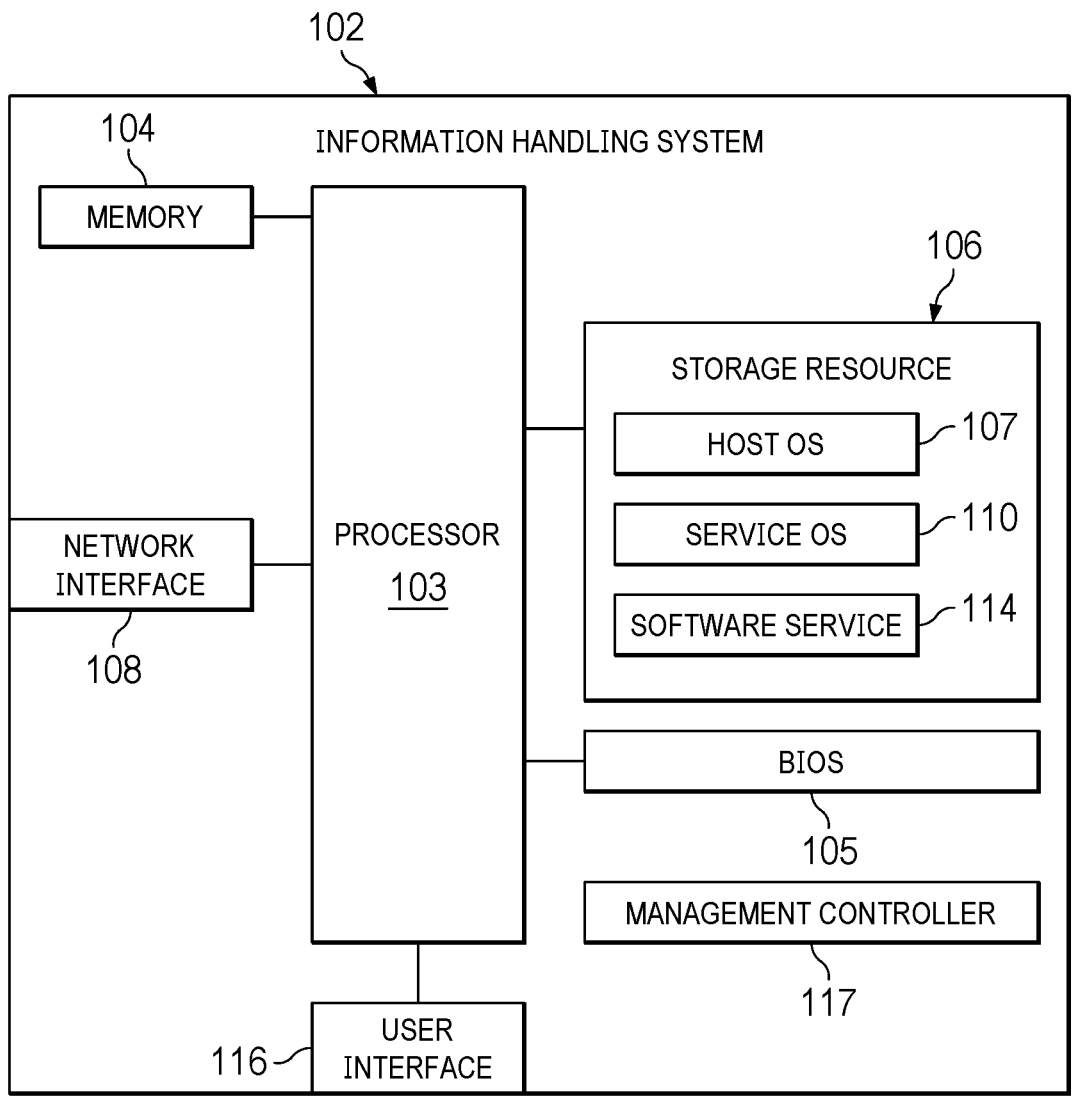
FIG. 1 illustrates a block diagram of an example information handling system, in accordance with certain embodiments of the present disclosure.
Figure 2:
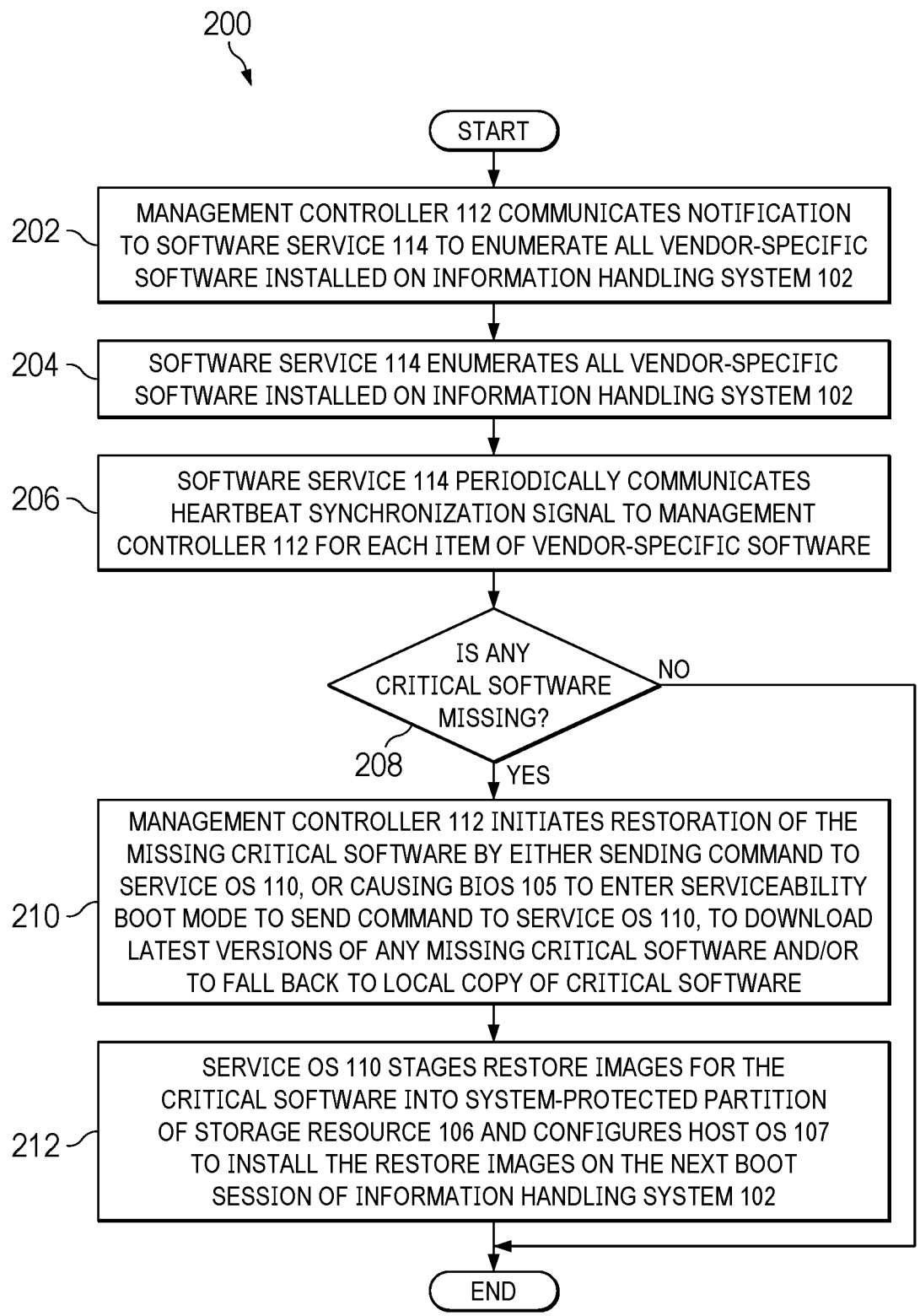
FIG. 2 illustrates a flow chart of an example method for restoring critical software using a management controller, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

FIG. 1 illustrates a block diagram of an example information handling system 102, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a basic input/output system (BIOS) 105 communicatively coupled to processor 103, a storage resource 106 communicatively coupled to processor 103, a network interface 108 communicatively coupled to processor 103, a management controller 112 communicatively coupled to processor 103, and a user interface 116 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 105, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. In some embodiments, storage resource 106 may reside internal to a chassis or other enclosure comprising information handling system 102 and not be readily accessible without opening such chassis or other enclosure. In other embodiments, storage resource 106 may reside internal to a chassis or other enclosure comprising information handling system 102. As shown in FIG. 1, storage resource 106 may have stored thereon a host operating system (OS) 107, service OS 110, and a software service 114.

Host OS 107 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by host OS 107. Active portions of host OS 107 may be transferred from storage resource 106 to memory 104 for execution by processor 103.

Service OS 110 may comprise a special-purpose, limited functionality operating system that may be used for management and/or diagnostics of information handling system 102. As described in greater detail below, service OS 110 may also include components configured to detect for missing critical software of information handling system 102 and/or to facilitate cloud-centric deployment images of such critical software. Although service OS 110 is depicted as residing on storage resource 106, in some embodiments, service OS 110 may be a component of BIOS 105.

Software service 114 may comprise a special-purpose, limited functionality application program that may be used in concert with management controller 112 to assist management controller 112 in detecting whether critical software is present or missing from information handling system 102, as described in greater detail below. Software service 114 may be a component of host OS 107, service OS 110, or its own standalone application that executes on host OS 107. Although software service 114 is depicted as residing on storage resource 106, in some embodiments, software service 114 may be a component of BIOS 105.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC." Although not shown in FIG. 1, network interface 108 may be communicatively coupled via a network to a provisioning server from which information handling system 102 may download software and firmware components of information handling system 102, including without limitation an image for host OS 107.

Management controller 112 may be configured to provide out-of-band management facilities for management of information handling system 102. Such management may be made by management controller 112 even if information handling system 102 is powered off or powered to a standby state. Management controller 112 may include a processor, memory, out-of-band network interface separate from and physically isolated from an in-band network interface of information handling system 102, and/or other embedded information handling resources. In certain embodiments, management controller 112 may include or may be an integral part of a baseboard management controller (BMC) or a remote access controller (e.g., a Dell Remote Access Controller or Integrated Dell Remote Access Controller). In other embodiments, management controller 112 may include or may be an integral part of a chassis management controller (CMC). In yet other embodiments, management controller 112 may include or may be an integral part of an embedded controller (EC). Management controller 112 may include firmware comprising a program of executable instructions configured to be read and executed by management controller 112 in order to carry out the functionality of management controller 112, including functionality of management controller 112 described herein.

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

In operation, during startup enumeration of information handling system 102, management controller 112 may enumerate software components of information handling system 102 and proactively alert a user if critical software is missing and seeks user consent to restore such critical software if missing. Alternatively, if a user so chooses, management controller 112 may wait until information handling system 102 experiences frequent stop errors (e.g., frequent occurrence of a "blue screen of death"), incomplete system boots, or other problems before management controller 112 triggers restoration of missing critical software.

FIG. 2 illustrates a flow chart of an example method 200 for restoring critical software using a management controller, in accordance with certain embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 112 may communicate to software service 114 a notification to enumerate all vendor-specific software installed on information handling system 102. At step 204, in response to the notification, software service 114 may enumerate all vendor-specific software installed on information handling system 102. For example, in some embodiments, software service 114 may scan a registry of host OS 107 to identify any installed vendor-specific software. In such embodiments, such scan of the registry may determine vendor-specific software availability (e.g., pause, stop, not present, etc.).

At step 206, software service 114 may, for each enumerated vendor-specific software, periodically (e.g., once every five minutes) communicate a heartbeat synchronization signal to management controller 112. In some embodiments, a heartbeat synchronization signal for an enumerated vendor-specific software may include a metadata payload regarding the enumerated vendor-specific software, including without limitation version information for the vendor-specific software. In these and other embodiments, a heartbeat synchronization signal may comprise a memory-mapped input/output (MMIO) command to management controller 112.

At step 208, management controller 112 may determine, based on the heartbeat synchronization signals for the enumerated vendor-specific software items, whether any critical software is missing. In some embodiments, the list of critical software to check for and restore may be dynamically updated using a subscription model. For purposes of this disclosure, "missing" may be construed to mean that the critical software is entirely absent from information handling system 102 (meaning that no heartbeat synchronization signal may be communicated for such critical software) or that an incorrect or undesired (e.g., or not updated) version of the critical software is not present. If critical software is missing, method 200 may proceed to step 210. Otherwise, method 200 may end.

At step 210, management controller 112 may initiate a restoration of the missing critical software by either sending a command to service OS 110, or causing BIOS 105 to enter a serviceability boot mode to send the command to service OS 110, to download (e.g., via network interface 108) the latest versions of any missing critical software and/or to fall back to a local copy of the critical software bundled within service OS 110 at time of release. In some embodiments, such commands may create an Advanced Configuration and Power Interface (ACPI) table that is presented to service OS 110.

At step 212, service OS 110 may stage the restore images for the critical software into a system-protected partition of storage resource 106 or other computer-readable media, and configure host OS 107 to install the restore images on the next boot session of information handling system 102. In some embodiments, such restoration may comprise installation of "last known good" software. For example, service OS 110 may read an ACPI table presented to it (e.g., as described in step 210 above) and determine missing critical software based thereon. In some embodiments, service OS 110 may be configured to (e.g., via user interface 116) query a user of information handling system 102 whether or not to restore missing critical software and may install such critical software only if the user consents. In these and other embodiments, service OS 110 may be configured to examine an operating system registry to determine whether software has been present on information handling system 102, and if such software is present, service OS 110 may update registry entries to cause such software to execute on a subsequent boot session of host OS 107.

After completion of step 212, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

In some embodiments, other steps or operations may occur prior to step 208. For example, in some embodiments, before execution of step 208, BIOS 105 may examine if information handling system 102 experiences any stop errors, failures to boot, or incomplete boots, in which case method 200 may end in response to any of these events. In these and other embodiments, BIOS 105 may further check if information handling system 102 is undergoing a flash update to BIOS 105 and/or a recovery mode of operation, and then proceed to step 208 after such update and/or recovery is finished.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

What is claimed is:

1. An information handling system comprising:
   a processor; and
   a management controller electrically coupled to the processor and configured to provide out-of-band management facilities for management of the information handling system, the management controller further configured to:
      in response to one or more heartbeat synchronization signals received from a software service of the information handling system, wherein each of the one or more heartbeat synchronization signals is associated with an item of software stored on the information handling system, determine if any critical software is missing from the information handling system; and
      for each item of missing critical software, cause a service operating system of the information handling system to stage installation of a restore image of such item.

2. The information handling system of claim 1, wherein the management controller is configured to determine if an item of critical software is missing if the item is absent from the information handling system or if an undesired version of the item is absent from the information handling system.

3. The information handling system of claim 1, wherein causing the service operating system of the information handling system to stage installation of the restore image of each item of missing critical software comprises communicating a command from the management controller to the service operating system.

4. The information handling system of claim 1, wherein causing the service operating system of the information handling system to stage installation of the restore image of each item of missing critical software comprises causing a basic input/output system of the information handling system to enter a serviceability boot mode to communicate a command from the basic input/output system to the service operating system.

5. The information handling system of claim 1, wherein the one or more heartbeat synchronization signals are received in response to the management controller communicating to the software service a command to enumerate items of software stored on the information handling system.

6. The information handling system of claim 1, wherein staging installation of a restore image of an item of critical software comprises one of:
   downloading a latest version of the item of critical software; or
   staging installation of a local copy of the item of critical software bundled within the service operating system.

7. The information handling system of claim 1, wherein the management controller is further configured to configure a host operating system of the information handling system to restore the critical software during a subsequent boot session of the information handling system.

8. A method comprising:
   in response to one or more heartbeat synchronization signals received from a software service of an information handling system by a management controller, wherein each of the one or more heartbeat synchronization signals is associated with an item of software stored on the information handling system, determining, by the management controller, if any critical software is missing from the information handling system; and
   for each item of missing critical software, causing, by the management controller, a service operating system of the information handling system to stage installation of a restore image of such item.

9. The method of claim 8, further comprising determining, by the management controller, if an item of critical software is missing if the item is absent from the information handling system or if an undesired version of the item is absent from the information handling system.

10. The method of claim 8, wherein causing the service operating system of the information handling system to stage installation of the restore image of each item of missing critical software comprises communicating a command from the management controller to the service operating system.

11. The method of claim 8, wherein causing the service operating system of the information handling system to stage installation of the restore image of each item of missing critical software comprises causing a basic input/output system of the information handling system to enter a serviceability boot mode to communicate a command from the basic input/output system to the service operating system.

12. The method of claim 8, wherein the one or more heartbeat synchronization signals are received in response to the management controller communicating to the software service a command to enumerate items of software stored on the information handling system.

13. The method of claim 8, wherein staging installation of a restore image of an item of critical software comprises one of:
   downloading a latest version of the item of critical software; or
   staging installation of a local copy of the item of critical software bundled within the service operating system.

14. The method of claim 8, further comprising configuring, by the management controller, a host operating system of the information handling system to restore the critical software during a subsequent boot session of the information handling system.

15. An article of manufacture comprising:
   a non-transitory computer readable medium; and
   computer-executable instructions carried on the non-transitory computer readable medium, the instructions readable by a processor, the instructions, when read and executed, for causing the processor to, in a management controller of an information handling system:
      in response to one or more heartbeat synchronization signals received from a software service of an information handling system by the management controller, wherein each of the one or more heartbeat synchronization signals is associated with an item of software stored on the information handling system, determine if any critical software is missing from the information handling system; and for each item of missing critical software, cause a service operating system of the information handling system to stage installation of a restore image of such item.

16. The article of claim 15, the instructions for further causing the processor to determine if an item of critical software is missing if the item is absent from the information handling system or if an undesired version of the item is absent from the information handling system.

17. The article of claim 15, wherein causing the service operating system of the information handling system to stage installation of the restore image of each item of missing critical software comprises communicating a command from the management controller to the service operating system.

18. The article of claim 15, wherein causing the service operating system of the information handling system to stage installation of the restore image of each item of missing critical software comprises causing a basic input/output system of the information handling system to enter a serviceability boot mode to communicate a command from the basic input/output system to the service operating system.

19. The article of claim 15, wherein the one or more heartbeat synchronization signals are received in response to the management controller communicating to the software service a command to enumerate items of software stored on the information handling system.

20. The article of claim 15, wherein staging installation of a restore image of an item of critical software comprises one of:

downloading a latest version of the item of critical software; or staging installation of a local copy of the item of critical software bundled within the service operating system.

21. The article of claim 15, the instructions for further causing the processor to configure a host operating system of the information handling system to restore the critical software during a subsequent boot session of the information handling system.

\* \* \* \* \*